United States Patent [19]

Kasturia et al.

[11] Patent Number: 5,299,047
[45] Date of Patent: Mar. 29, 1994

[54] TERNARY DATA COMMUNICATION USING MULTIPLE POLARIZATIONS

[75] Inventors: Sanjay Kasturia; Jack H. Winters, both of Middletown, N.J.

[73] Assignee: AT&T Bell Laboratories, Murray Hill, N.J.

[21] Appl. No.: 862,389

[22] Filed: Apr. 2, 1992

[51] Int. Cl.[5] .................... H04B 10/04; H04B 10/06
[52] U.S. Cl. ................................. 359/156; 359/181; 359/189
[58] Field of Search ............... 359/122, 154, 156, 192, 359/181-186, 189, 195, 188; 375/17; 307/311

[56] References Cited

U.S. PATENT DOCUMENTS 5,023,950  6/1991  Tsushima ............................ 359/154
5,184,243  2/1993  Henmi ................................ 359/154

FOREIGN PATENT DOCUMENTS 0403991  12/1990  European Pat. Off. ............. 359/187
0475640   3/1992  European Pat. Off. ............. 359/122

OTHER PUBLICATIONS

S. G. Evangelides, Jr. et al., "Polarization Multiplexing With Solitons", Jour. of Lightwave Technology, vol. 10, No. 1, Jan. 1992, pp. 28-35.

R. Cross et al., "Polarization Measurement Goes Automatic", Lasers & Optronics, Nov. 1991, pp. 25-26.

L. Seto et al., "Coherent Optical Polarization-Shift-Keying (POLSK) Homodyne System Using Phase-Diversity Recievers," IEEE Global Telecomm. Conference, Phoenix, Arizona, Dec. 2-5, 1991, pp. 1601-1605.

R. Calvani et al., "An Experiment of Optical Heterodyne Transmission With Polarization Modulation At 140 Mbit/s Bitrate and 1550 nm Wavelength", IEEE Global Telecommunications Conference, Phoenix, Arizona, Dec. 2-5, 1991, pp. 1587-1591.

*Primary Examiner*—Leslie Pascal
*Attorney, Agent, or Firm*—Gerard A. deBlasi

[57] ABSTRACT

Higher information rates are achieved in lightwave communication systems by using optical signals of different polarizations to represent data as ternary digits. Each ternary digit assumes a value, for example, of either zero, logic 1 (e.g., an amplitude of one unit) on a first polarization, or logic 1 on a second polarization. The ternary digits are transmitted to a receiver through a single optical fiber by modulating the optical signals in time with one of these two polarizations or zero. The receiver determines the value of each ternary digit by determining that the received optical signal has a value of either zero or logic one on a particular one of the two polarizations.

17 Claims, 7 Drawing Sheets

*FIG. 1*
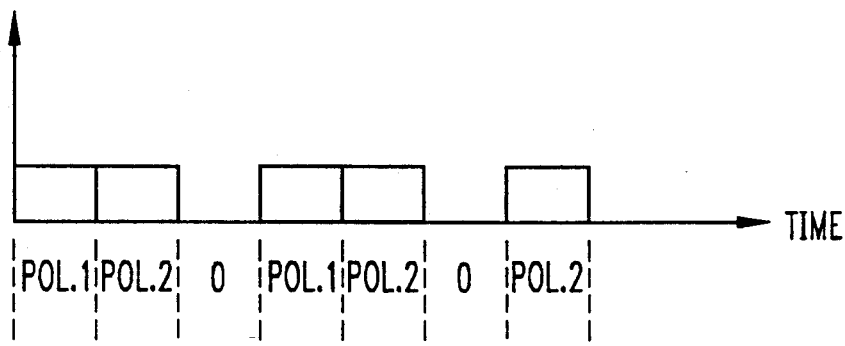
*FIG. 2*
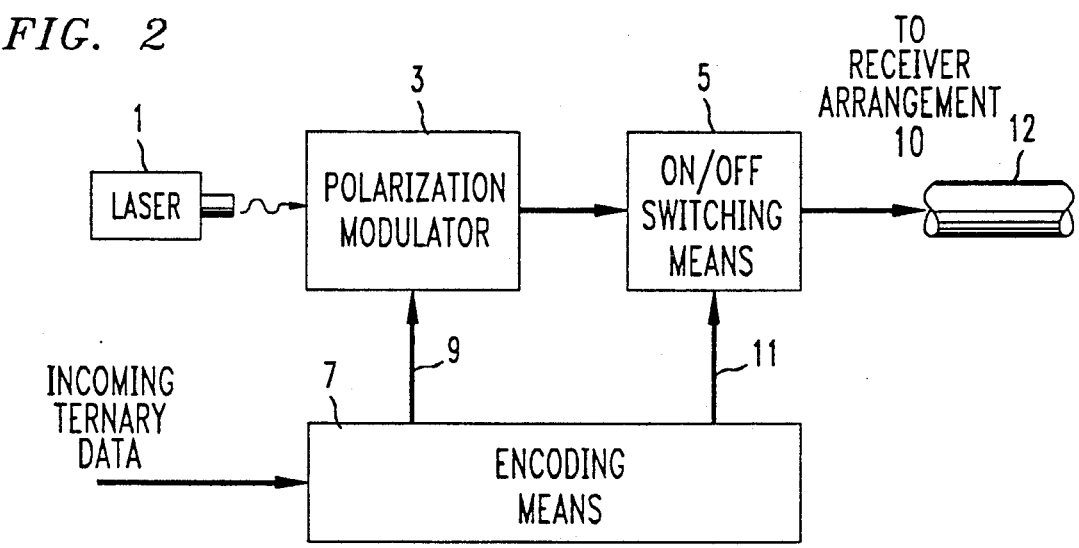
*FIG. 3*
| INPUT TERNARY DATA VALUE | CONTROL LINE 9 | CONTROL LINE 11 | OPTICAL SIGNAL ON FIBER 12 |
|---|---|---|---|
| 0 | 0 OR 1 | 0 | 0 |
| 1 | 0 | 1 | POL. 1 |
| 2 | 1 | 1 | POL. 2 |

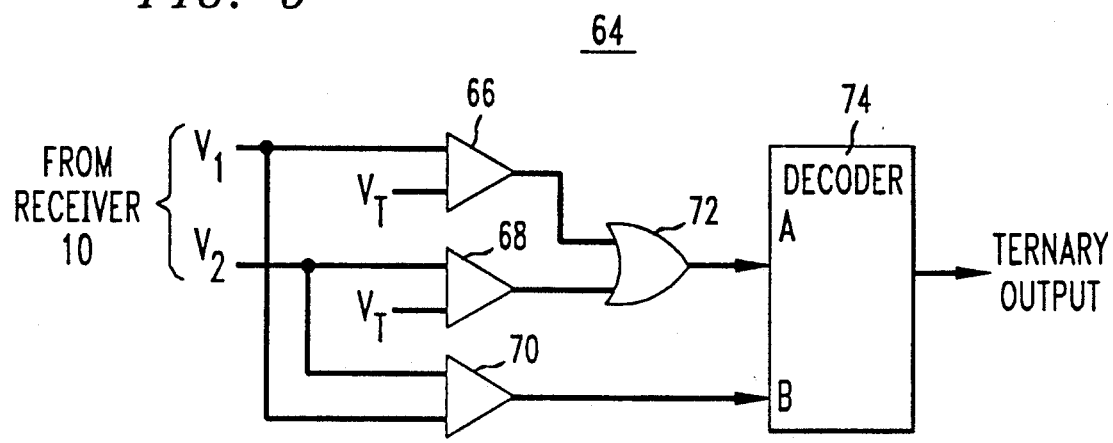

TERNARY DATA COMMUNICATION USING MULTIPLE POLARIZATIONS

FIELD OF THE INVENTION

This invention relates to lightwave communication techniques. More particularly, this invention relates to methods and apparatus for increasing the transmission capacity of lightwave communication systems.

BACKGROUND OF THE INVENTION

Demand for bandwidth in lightwave communication systems is ever increasing. This increasing demand can be met by installing additional fiber cable. However, augmentation of existing long distance fiber systems is costly. Thus, it is desirable to use existing systems to maximum capacity.

One technique for increasing the capacity of an existing fiber system is a form of space division multiplexing in which two optical signals of different polarizations are simultaneously transmitted through a single optical fiber. Simultaneous transmission of different data sequences in the same fiber via a separate polarization for each sequence permits doubles the amount of information passing through the fiber. However, polarization mode dispersion and nonlinear effects in the fiber will cause two simultaneously transmitted optical signals to interfere with each other. For example, polarization mode dispersion and nonlinear effects induce phase changes and power dependent distortion in the polarized optical signals as the signals pass through the fiber. This, in turn, makes the two interfering optical signals difficult to distinguish from each other. Inability to distinguish between the signals makes it difficult to exploit the second, orthogonal polarization dimension to achieve higher information rates by space division multiplexing of the signals.

SUMMARY OF THE INVENTION

Higher information rates are achieved in lightwave communication systems by using optical signals of different polarizations to represent data as ternary digits. A single data sequence is modulated onto separately polarized optical signals so that the information content of the input data sequence is distributed between the two polarizations. Each ternary digit assumes a value of logic 1 (e.g., an amplitude of one unit) on a first polarization, logic 1 on a second polarization, or zero in both polarizations. The ternary digits are transmitted to a receiver through a single optical fiber by modulating the optical signals in time with one of these two polarizations or zero. The receiver determines the value of each ternary digit by determining that the received optical signal has a value of either zero or logic one on a particular one of the two polarizations. Using multiple polarizations in this manner to transmit sequences of ternary digits enables higher information rates than can be achieved by transmitting the same data as a sequence of binary digits using a single polarization.

BRIEF DESCRIPTION OF THE DRAWINGS

In the drawings:

FIG. 1 is an illustrative waveform of data transmitted in accordance with the principles of the present invention;

FIG. 2 is a block diagram of illustrative apparatus, for transmitting optical signals of different polarizations, that is suitable for use with the data transmission technique of the present invention;

FIG. 3 is an illustrative table of control signal values on control lines 9 and 11 and the effect of those control signals on the optical signal injected into optical fiber 12;

FIG. 9 is a block diagram of illustrative circuitry for decoding the output of the apparatus of FIG. 4 into ternary data; and FIG. 10 is an illustrative table of values implemented by the decoding circuitry of FIG. 9.

DETAILED DESCRIPTION

Figure 4:
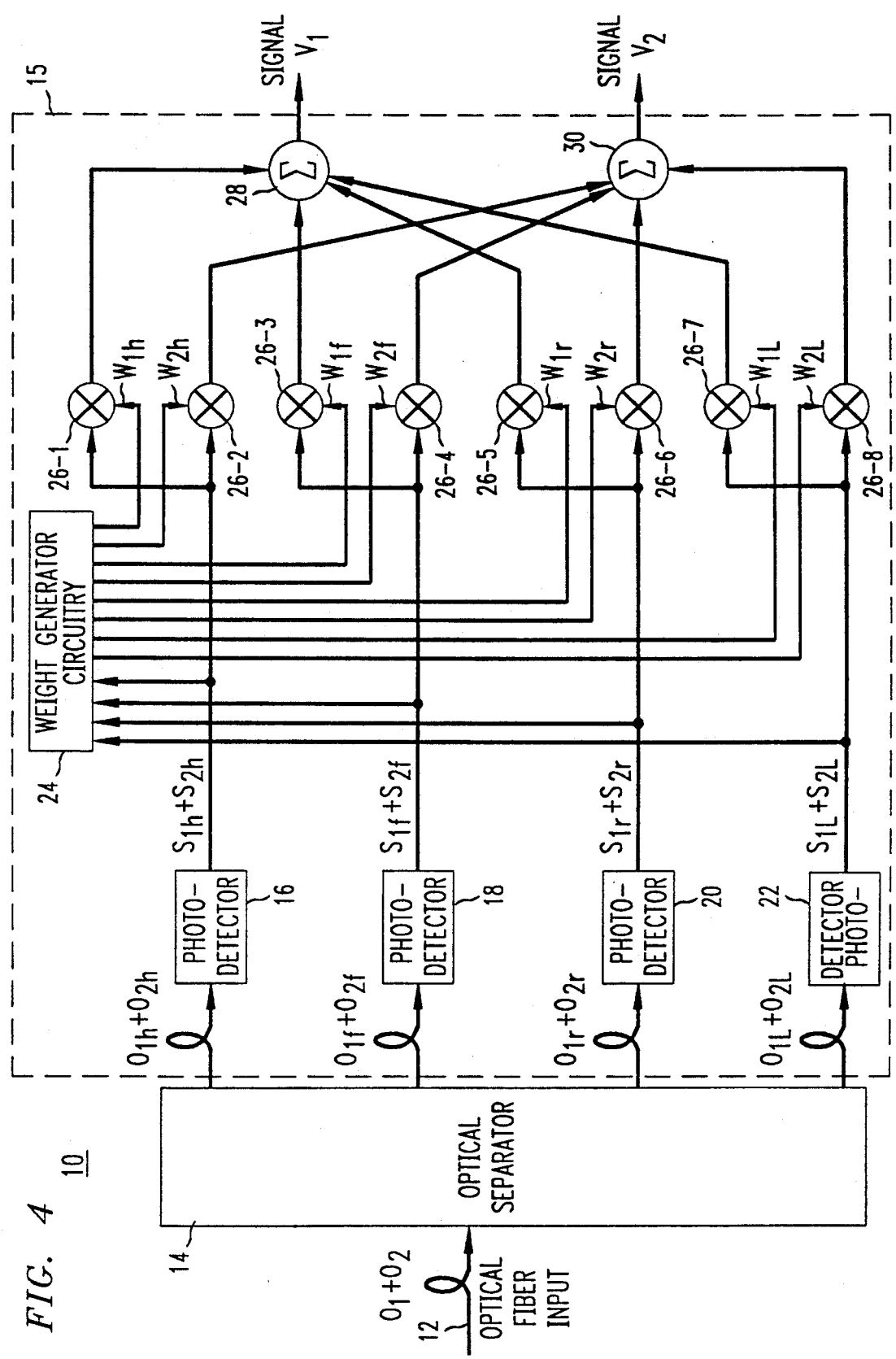
FIG. 4 is a block diagram of an illustrative apparatus, for distinguishing between and detecting optical signals of different polarizations, that is suitable for use with the data transmission technique of the present invention.

Increased data transfer capacity of an optical fiber is achieved by using two orthogonal polarizations to transmit data through the fiber. Each data symbol assumes one of three possible values: logic 1 (e.g., an amplitude of one unit) on polarization 1, logic 1 on polarization 2, or zero. By using two polarizations to transmit ternary digits in accordance with the invention, an increase in transmission capacity of approximately 58 percent over transmitting data using only a single polarization is achieved. This increased transmission capacity is realized without the penalty of increased distortion that would result from simultaneous transmission of different data sequences in the same fiber via a separate polarization for each sequence.

Referring now to the figures, FIG. 1 shows an illustrative sequence of data that has been transmitted in accordance with the principles of the present invention. Prior to transmission, data are encoded from a series of binary digits into blocks of ternary numbers using ternary encryption techniques that are well-known in the art. The ternary digits are transmitted to a receiver through a single optical fiber by modulating the optical signals in time with one of these two polarizations or zero—a process generally referred to herein as "ternary modulation." The ternary data are then detected using a receiver arrangement capable of distinguishing between multiple polarizations. The detected ternary data are decoded to retrieve the original series of binary digits of data.

FIG. 2 illustrates a transmitter arrangement suitable for implementing ternary modulation. The transmitter arrangement includes a laser 1, a polarization modulator 3, an on/off switching means 5, and encoder means 7. Of course, it will be apparent to one skilled in the art that other transmitter arrangements may be used to transmit data in accordance with the invention.

In the embodiment of FIG. 2, laser 1 outputs a continuous beam of light to polarization modulator 3. Polarization modulator 3 modulates the continuous beam to output a continuous beam having one of two orthogonal polarizations, namely, either polarization 1 or polarization 2. The signal output from polarization modulator 3 is input to on/off switching means 5. On/off switching means 5 is coupled to optical fiber 12. When operating in the "on" mode, on/off switching means 5 passes light output from polarization modulator 3 to optical fiber 12. When operating in the "off" mode, on/off switching means 5 prevents light from passing from polarization modulator 3 to optical fiber 12.

Encoder means 7 controls the operation of polarization modulator 3 and on/off switching means 5. Encoder means 7 illustratively receives ternary data and outputs encoded control signals to polarization modulator 3 and on/off switching means 5 via control lines 9 and 11, respectively. The control signal on control line 9 causes polarization modulator 3 to output polarization 1 or polarization 2. The control signal on control line 11 determines whether on/off switching means 5 will output the polarization from polarization modulator 3. Encoder means 7 also may perform the necessary timing control functions.

FIG. 3 shows an illustrative table of values for the control signals on control lines 9 and 11 for three ternary values input to encoder means 7, and the effect of those control signals on the optical signal injected into optical fiber 12. In this example, a ternary value of zero is transmitted by outputting a control signal of logic 0 on control line 11 to cause on/off switching means 5 to operate in the "off" mode. Ternary values of 1 and 2 are transmitted by outputting a control signal of logic 1 on control line 11 to cause on/off switching means 5 to operate in the "on" mode, and outputting a control signal of logic 0 or logic 1 on control line 9 to cause polarization modulator 3 to output optical signals of polarization 1 or polarization 2, respectively.

It should be understood that optical signals $O_1$ and $O_2$ at polarization 1 and 2, respectively, are transmitted at different times when implementing ternary modulation. However, polarization mode dispersion and non-linear effects in the optical fiber can cause cross-talk between optical signals $O_1$ and $O_2$. Thus, in many instances it is necessary or at least desirable to detect these optical signals with a detector capable of correcting polarization distortion and nonlinear effects.

FIG. 4 shows an exemplary polarization receiver arrangement 10 which distinguishes between two optical signals of different and arbitrary polarizations and corrects polarization distortion. Receiver arrangement 10 detects and processes, for each optical signal, four polarization components whose combination uniquely determines the polarization of that signal. As described below, the polarization components are processed to generate the electrical output signals $V_1$ and $V_2$. Output signals $V_1$ and $V_2$ are proportional to the first and second received optical signals, respectively, and are free of cross-talk. Output signals $V_1$ and $V_2$ are used by a decoding means, as described below with respect to FIG. 9, to determine the value of the detected ternary symbols. Other variations of receivers suitable for use with the present invention are described in commonly-owned, co-pending U.S. patent application Ser. No. 07/862,398, filed concurrently herewith, entitled "Multiple Polarization Sensitive Detection Arrangement For Fiber Optic Communication."

Receiver 10 includes an optical separator arrangement 14 and processing means 15. Processing means 15 includes photodectors 16, 18, 20, and 22, weight generator circuitry 24, attenuators 26-1 through 26-8 (also collectively referred to as attenuators 26), and adders 28 and 30.

Optical separator 14 separates first and second optical signals $O_1$ and $O_2$ output from optical fiber input 12 into four polarization components: horizontal linear (including $O_{1h}$ and $O_{2h}$), 45 degree linear ($O_{1f}$ and $O_{2f}$), right-hand circular ($O_{1r}$ and $O_{2r}$), and left-hand circular ($O_{1l}$ and $O_{2l}$). Optical separator 14 outputs these polarization components to photodetectors 16, 18, 20, and 22, respectively, of processing means 15.

Each photodetector converts a respective one of the optical polarization components into an electrical signal that is proportional to the optical signal incident on that detector. The output of each photodetector is provided to a pair of attenuators 26 associated with that photodetector and weight generator circuitry 24. Thus, each pair of attenuators 26 receives an electrical signal corresponding to a different polarization component. For example, photodetector 16 outputs to attenuators 26-1 and 26-2 an electrical signal proportional to the horizontal linear polarization components of the received optical signals. Similarly, photodetector 18 outputs to attenuators 26-3 and 26-4 an electrical signal proportional to the 45 degree linear polarization components of the received optical signals.

As described in greater detail below, weight generator circuitry 24 determines an appropriate weighting vector to be applied by attenuators 26 to the respective polarization components received by each attenuator. For example, as shown in FIG. 4, weight generator circuitry 24 outputs weighting signals $W_{1h}$ and $W_{2h}$ to attenuators 26-1 and 26-2, respectively. Attenuators 26 may be implemented as variable gain amplifiers, multipliers, or other similar attenuating means.

Attenuators 26-1, 26-3, 26-5, and 26-7 output to adder 28 the weighted polarization components (h, f, r, and l) that are to be combined to generate output signal $V_1$. Attenuators 26-2, 26-4, 26-6, and 26-8 output to adder 30 the weighted polarization components that are to be combined to generate output signal $V_2$.

Although the receiver has been described illustratively as weighting polarization components to distinguish between two polarizations, one skilled in the art will readily appreciate that conventional non-linear processing techniques can be used to process the polarization components to distinguish between polarizations. One example of a suitable non-linear processing technique is maximum likelihood detection. Such non-linear processing techniques are particularly well-suited for processor-based implementations of the receiver.

Figure 5:
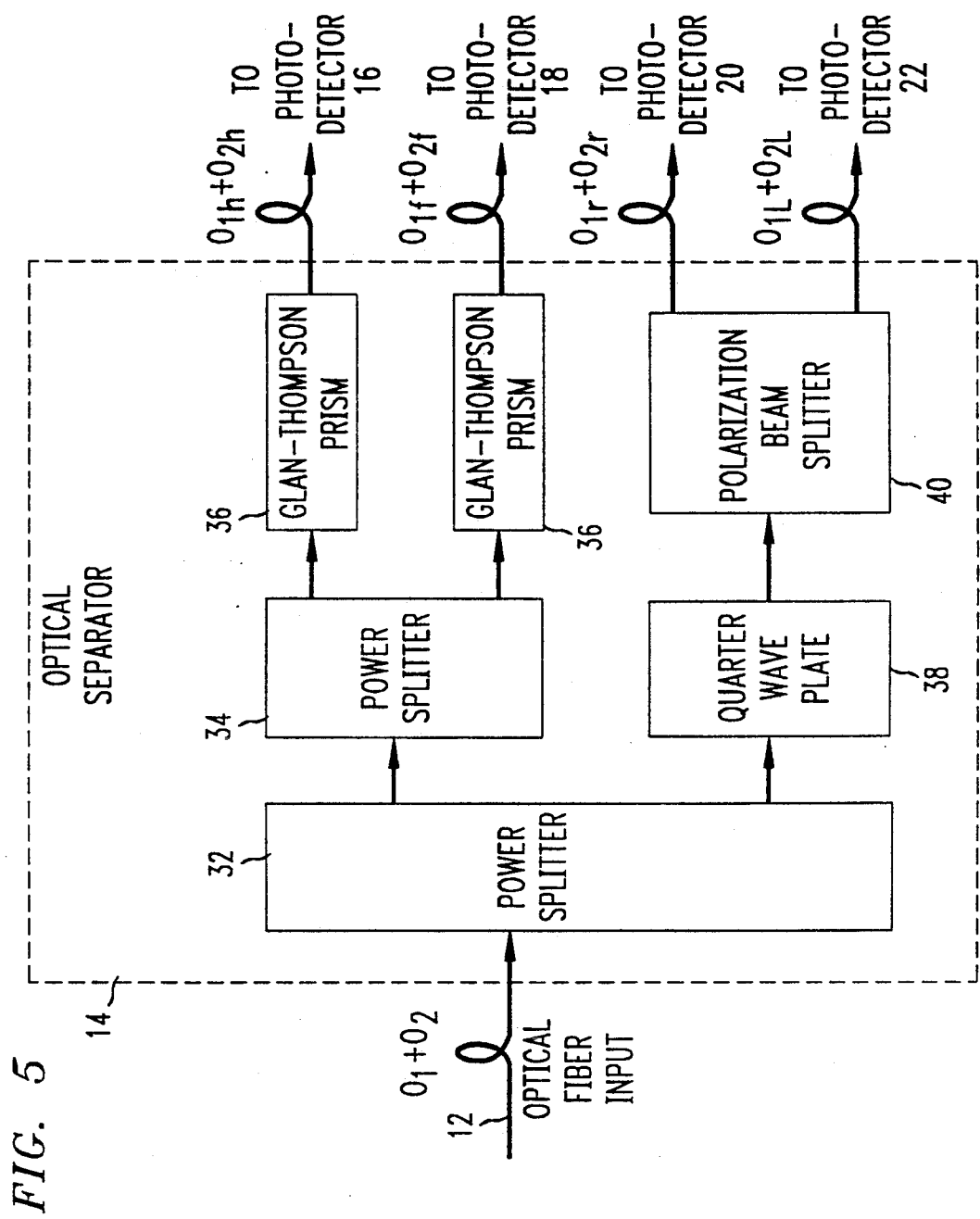
FIG. 5 is a block diagram of the optical separator of FIG. 4.

FIG. 5 shows an illustrative embodiment of optical separator 14. Optical separator 14 includes two power splitters 32 and 34, Glan-Thompson prisms 36, a quarter wave plate 38, and a polarization beam splitter 40. Power splitter 32 divides the optical signals output from input optical fiber 12 into two components. A first component is input to a second power splitter 34 and a second component is output to quarter wave plate 38. Power splitter 34 further divides the optical signals passing through it into two components. Two Glan-Thompson prisms 36 output the horizontal and 45 degree polarization components of the optical signals to photodetectors 16 and 18 of FIG. 4, respectively. Quarter wave plate 38 converts the right-hand and left-hand circular polarization components of the signals from optical fiber 12 into a linear representation of those components. Polarization beam splitter 40 then separates the right hand circular polarization component from the left hand circular polarization component and outputs the separated components to photodetectors 20 and 22 of FIG. 4, respectively.

Figure 6:
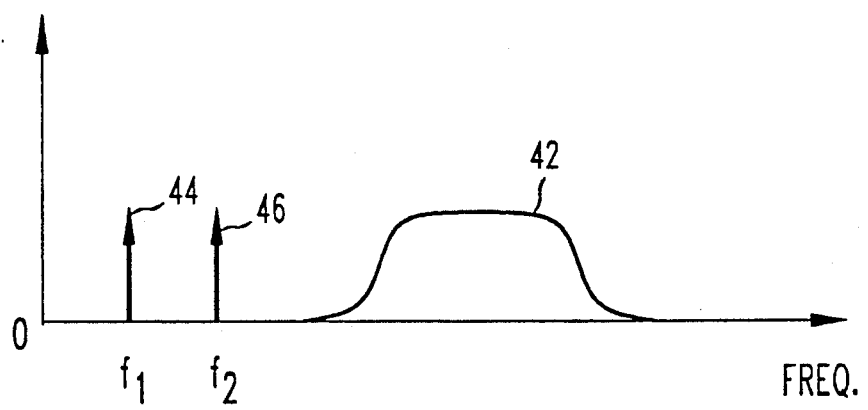
FIG. 6 is a graph of the frequencies of pilot and data signals for use with the apparatus of FIG. 4.

Illustratively, pilot signals (vectors) are used to determine the appropriate weighting signals to be applied by attenuators 26 to the four polarization components. Each of optical signals $O_1$ and $O_2$, transmitted through optical fiber 12 to receiver 10, is modulated by a low frequency pilot signal $P_1$ and $P_2$, respectively, and by a data signal $S_1$ and $S_2$, respectively. The pilot signals, shown in FIG. 6, are of different frequencies from each other and from data signals $S_1$ and $S_2$ (indicated by reference number 42). A first pilot signal 44 is transmitted with a frequency $f_1$ and a second pilot signal 46 is transmitted with a second frequency $f_2$. Typical frequencies for pilot signals 44 and 46 are between 10–50 kHz. Pilot signal 44 has the same relative strength from each polarization optical detector as does data signal $S_1$, and pilot signal 46 has the same relative strength from each polarization optical detector as does data signal $S_2$.

Figure 7:
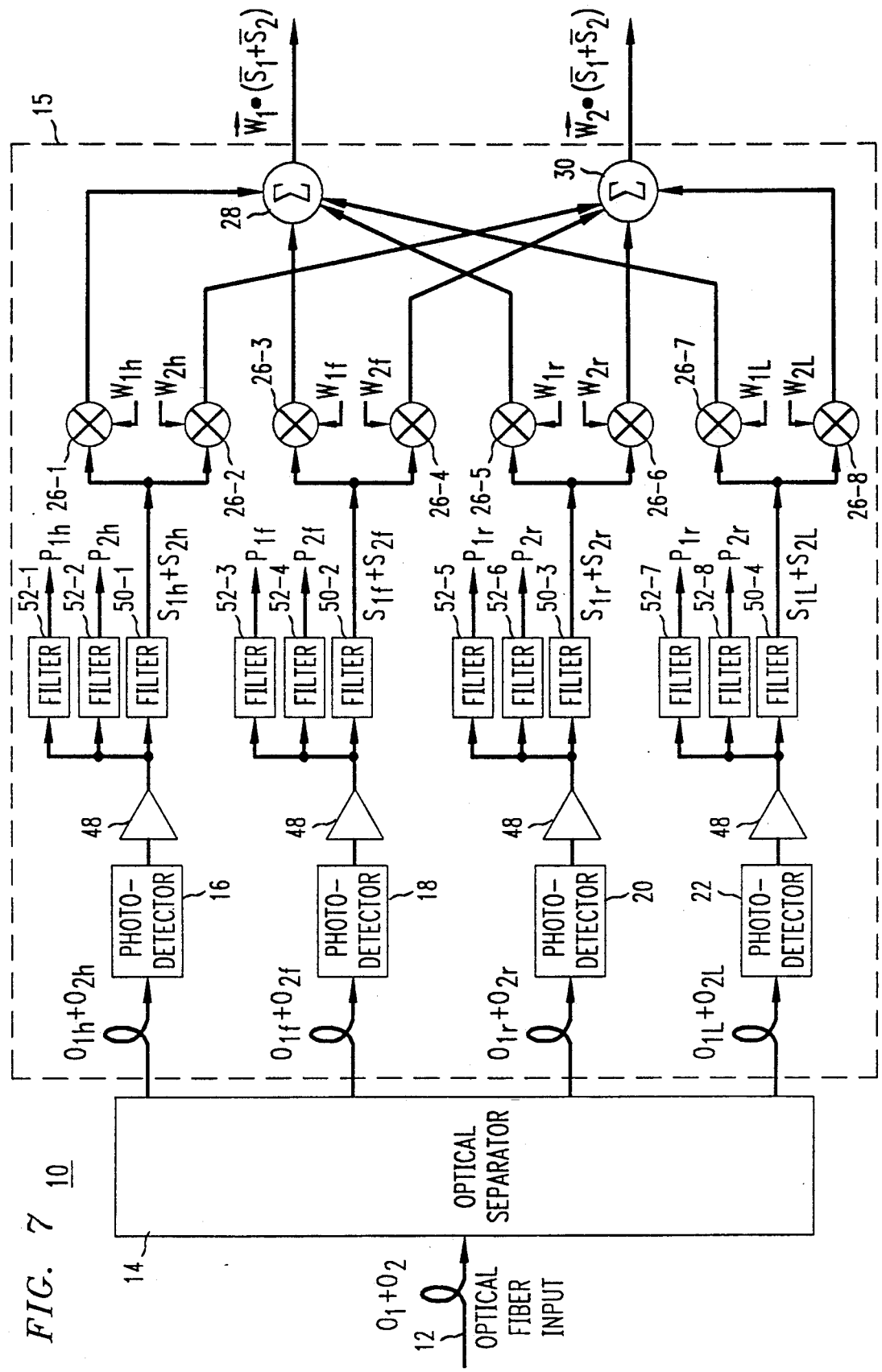
FIG. 7 is block diagram of the apparatus of FIG. 4 showing pilot vector generation circuitry.

FIG. 7 shows the receiver of FIG. 4 in greater detail. The ouputs of photodetectors 16, 18, 20, and 22 are amplified by preamplifiers 48 and passed to high pass filters 50-1 through 50-4 and low band pass filters 52-1 through 52-8. The high pass and low band pass filters separate the power incident on each photodetector into three components: the power $P_1$ associated with pilot signal 44, the power $P_2$ associated with pilot signal 46, and the sum of the powers associated with the combined data signals $S_1$ and $S_2$ from optical signals $O_1$ and $O_2$. In particular, low band pass filters 52-1 through 52-8 output the polarization components which correspond to the pilot signals. Low band pass filters 52-1, 52-3, 52-5, and 52-7 each separate the power corresponding to pilot signal 44 ($P_{1h}$, $P_{1f}$, $P_{1r}$, and $P_{1l}$, respectively) from the signal output from its respective detector. Similarly, low band pass filters 52-2, 52-4, 52-6, and 52-8 separate the power corresponding to pilot signal 46 ($P_{2h}$, $P_{2f}$, $P_{2r}$, and $P_{2l}$, respectively). High pass filters 50-1 through 50-4 pass the respective components of $S_1$ and $S_2$.

As described below, the power measurements for the four polarization components of each pilot signal are used by weight generator circuitry 24 to calculate the weighting factors. Because each of the pilot signals is associated with a polarization optical signal that is the same as one of the two data signals, the pilot signal powers $P_1$ and $P_2$ can be used to determine the ratio of power output from each photodetector that is attributable to each of data signals $S_1$ and $S_2$.

The power components of pilot signal 44 ($P_{1h}$, $P_{1f}$, $P_{1r}$, and $P_{1l}$) form the pilot vector $\vec{P}_1$. The power components of the pilot signal 46 ($P_{2h}$, $P_{2f}$, $P_{2r}$, and $P_{2l}$) form the pilot vector $\vec{P}_2$. Components of pilot vectors $\vec{P}_1$ and $\vec{P}_2$ are combined to generate four-component weighting vectors $\vec{W}_1$ and $\vec{W}_2$ according to the formulas:

$$\vec{W}_1 = (\vec{P}_2 \cdot \vec{P}_2)\vec{P}_1 - (\vec{P}_1 \cdot \vec{P}_2)\vec{P}_2; \text{ and}$$

$$\vec{W}_2 = (\vec{P}_1 \cdot \vec{P}_1)\vec{P}_2 - (\vec{P}_1 \cdot \vec{P}_2)\vec{P}_1$$

Components of $S_1$ and $S_2$ are multiplied by weighting vectors $\vec{W}_2$ and $\vec{W}_2$ using attenuators 26. As previously described, the resulting weighted signals are appropriately combined by adders 28 and 30 to generate two electrical output signals $V_1$ and $V_2$.

Figure 8:
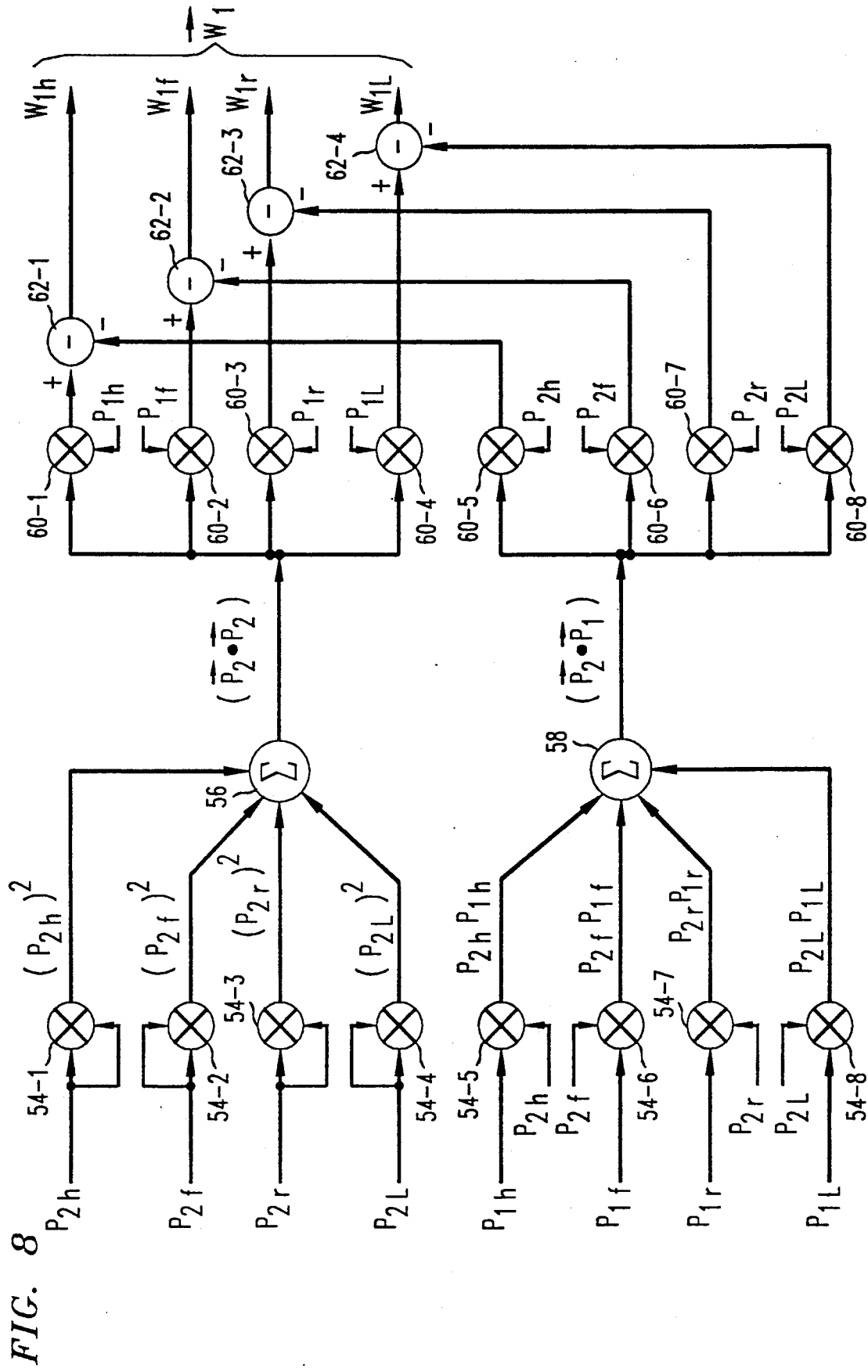
FIG. 8 is a block diagram of an illustrative apparatus for generating weight vectors from the pilot vectors generated by the circuitry of FIG. 7.

FIG. 8 shows the circuitry for generating weighting vector $\vec{W}_1$ for signal $S_1$. A similar circuit (not shown) generates weighting vector $\vec{W}_2$ for signal $S_2$. The weight generator circuitry of FIG. 8 includes multipliers 54-1 through 54-8, adders 56 and 58, multipliers 60-1 through 60-8, and subtracters 62-1 through 62-4. The components of weighting vectors $\vec{W}_1$ and $\vec{W}_2$ output from subtracters 62-1 through 62-4 are applied to the appropriate ones of attenuators 26, as discussed above.

With reference to FIG. 8, it is shown that the pilot vector components output from low band pass filters 52-1 through 52-8 are input to the terminals of multipliers 54-1 through 54-8. Multipliers 54-1 through 54-4 form the square of each polarization component of pilot vector $P_2$. Adder 56 forms the quantity $(\vec{P}_2 \cdot \vec{P}_2)$. Multipliers 60-1 through 60-4 form the quantity $(\vec{P}_2 \cdot \vec{P}_2)\vec{P}_1$. Similarly, multipliers 54-5 through 54-8, adder 58, and multipliers 60-5 through 60-8 form the quantity $(\vec{P}_2 \cdot \vec{P}_1)\vec{P}_2$. Subtracters 62-1 through 62-4 then form the four components of weighting vector $W_1$ according to the equation above.

Although weight generator circuit 24 has been described as using pilot signals for generating weights to be applied to the polarization components, appropriate weights can be determined directly from a received data signal $S_1$ or $S_2$. This may be accomplished, for example, by receiving data signal $S_1$ without data signal $S_2$, and determining the weights from the polarization components. Because the polarization components will not include any portion of $S_2$, the weights for $S_1$ can be determined directly. Thus, pilot signals are unnecessary.

The receiver arrangement described above is applicable to both coherent and direct detection systems. For linear processing and weighting to operate properly, the electrical signals output from the photodetectors must be linearly proportional to the optical signals. This will be true if signals $O_1$ and $O_2$ do not overlap, for example, due to fiber distortion. If the signals overlap, this can be accomplished in a direct detection system by proper design of $O_1$ and $O_2$ to cause cancelling of the nonlinear components of the electrical signals output from the photodetectors, e.g., by offsetting the carrier frequencies. Although the arrangement has been described in the context of a direct detection system, a local oscillator input (not shown) could be combined with the output of optical separator 14 for coherent detection.

It will be understood that the receiver arrangement of FIG. 4 is only illustrative of receivers suitable for use with the invention. For example, a detector arrangement comprising a conventional polarization controller followed by a polarization beam splitter can be used to separate and detect the optical signals in each of the two transmitted polarizations, provided that polarization mode dispersion and non-linear fiber effects are negligible. In particular, and for example, lithium niobate or mechanically adjustable bulk optical components can be used to correct polarization rotation and provide the corrected signal to a polarization beam splitter. The beam splitter separates the corrected signal into two signals having different polarizations. These two signals are then separately detected and provided to a decoder means for determining the value of the received ternary symbol.

FIG. 9 shows an exemplary embodiment of a decoder means 64 suitable for use with the present invention. Decoder means 64 includes voltage comparators 66, 68, and 70, an OR gate 72, and decoder circuit 74. As described below, decoder means receives signals $V_1$ and $V_2$ from receiver arrangement 10 (FIG. 4) and generates an output data stream of ternary data.

Comparator 66 receives signal $V_1$ from receiver arrangement 10 and compares that signal to a threshold voltage $V_T$. If $V_1$ exceeds $V_T$, comparator 66 outputs logic 1. If $V_1$ does not exceed $V_T$, comparator 66 outputs logic 0. Similarly, comparator 68 receives signal $V_2$ from receiver arrangement 10 and compares that signal to threshold voltage $V_T$. If $V_2$ exceeds $V_T$, comparator 68 outputs logic 1. If $V_2$ does not exceed $V_T$, comparator 68 outputs logic 0. The outputs of comparators 66 and 68 are input to OR gate 72. The output of OR gate 72, in turn, is input to input terminal A of decoder circuit 74.

Signals $V_1$ and $V_2$ also are provided to comparator 70. Comparator 70 determines which of $V_1$ and $V_2$ is greater and outputs this information to input terminal B of decoder circuit 74. Comparator 70 outputs logic 0 if $V_1$ is greater than $V_2$, and outputs logic 1 if $V_1$ is less than $V_2$.

Decoder circuit 74 implements the table of FIG. 10. If the value at input terminal A is logic 0, that is, neither $V_1$ nor $V_2$ exceeds the threshold voltage, the ternary output is zero. If the value at input terminal A is logic 1, the value at input terminal B indicates whether data has been transmitted using polarization 1 or polarization 2. The larger of signals $V_1$ and $V_2$ corresponds to the transmitted polarization. Thus, for example, if $V_1$ is greater than $V_2$, the data has been transmitted using polarization 1, and the ternary output is one. If $V_1$ is less than $V_2$, the data has been transmitted using polarization 2, and the ternary output is two.

It will be understood that the foregoing is merely illustrative of the principles of the invention, and that various modifications can be made by those skilled in the art without departing from the scope and spirit of the invention. For example, data can be transmitted in lightwave communication systems by using different, discrete light intensity levels to represent different values of optical data. Thus, the advantages of ternary modulation techniques may be further enhanced by transmitting light of different intensities, that is, multi-level signals, on each polarization. The scope of this invention is limited only by the claims.

We claim:

1. Apparatus for communicating on an optical fiber, the apparatus comprising:
    means for transmitting ternary data as a sequence of ternary symbols, each ternary symbol being transmitted during a symbol period and being representable by an optical signal selected from among the group of optical signals consisting of an intensity other than zero at a first polarization, an intensity other than zero at a second polarization, and zero intensity at the first and second polarizations;
    means for detecting separately, for each symbol period, a first optical signal received at the first polarization and a second optical signal received at the second polarization, and outputting first and second output signals respectively representing the first and second optical signals detected at the first and second polarizations during successive symbol periods; and
    means for processing the first and second output signals to generate an output data stream corresponding to the transmitted data.

2. The apparatus as defined in claim 1 wherein the first and second polarizations are orthogonal to each other when transmitted.

3. The apparatus as defined in claim 1 wherein the detecting means comprises a receiver that compensates for polarization distortion.

4. The apparatus as defined in claim 1 wherein the detecting means comprises a polarization controller.

5. The apparatus as defined in claim 1 wherein the transmitting means transmits multi-level optical signals in at least one of the first and second polarizations.

6. The apparatus as defined in claim 1 further comprising means for encoding a series of binary data bits into a sequence of ternary symbols.

7. A method for communicating on an optical fiber comprising the steps of:
    transmitting data as a sequence of ternary symbols, each ternary symbol being transmitted during a symbol period and being representable by an optical signal selected from among the group of optical signals consisting of an intensity other than zero at a first polarization, an intensity other than zero at a second polarization, and zero intensity at the first and second polarizations;
    detecting separately, for each symbol period, a first optical signal received at the first polarization and a second optical signal received at the second polarization, and outputting first and second output signals respectively representing the first and second optical signals detected at the first and second polarizations during successive symbol periods; and
    processing the first and second output signals to generate an output data stream corresponding to the transmitted data.

8. The method as defined in claim 7 wherein the first and second polarizations are orthogonal to each other when transmitted.

9. The method as defined in claim 7 wherein the transmitting step comprises transmitting multi-level optical signals in at least one of the first and second polarizations.

10. The method as defined in claim 7 further comprising the step of encoding a series of binary data bits into a sequence of ternary symbols prior to performing the transmitting step.

11. Apparatus comprising:
    means for receiving, during a symbol period, optical signals selected from among the group of optical signals consisting of an intensity other than zero in a first polarization, an intensity other than zero in a second polarization, and zero intensity in the first and second polarizations, the optical signals collectively representing a ternary symbol;
    means for detecting, during each symbol period, a value received at each of the first and second polarizations, and generating first and second output streams respectively representing the values detected at the first and second polarizations during successive symbol periods; and
    means for processing the first and second output streams to generate a sequence of ternary symbols.

12. The apparatus as defined in claim 11 wherein the detecting means comprises a receiver that compensates for polarization distortion.

13. The apparatus as defined in claim 11 wherein the detecting means comprises a polarization controller.

14. Apparatus comprising:

means for receiving a stream of ternary symbols; and
means for modulating the stream of ternary symbols onto separately polarized optical signals, wherein each ternary symbol is represented by an optical signal selected from among the group consisting of an intensity other than zero at a first polarization, an intensity other than zero at a second polarization, and zero intensity at the first and second polarizations.

15. The apparatus as defined in claim 14 wherein the first and second polarizations are orthogonal to each other.

16. The apparatus as defined in claim 14 wherein the symbol is representable as a multi-level optical signal in at least one of the first and second polarizations.

17. The apparatus as defined in claim 14 further comprising means for encoding a series of binary data bits into the stream of symbols, and wherein each symbol is a ternary symbol.

* * * * *